United States Patent [19]

Tanaka

[11] Patent Number: 4,505,522
[45] Date of Patent: Mar. 19, 1985

[54] INFINITE CIRCUIT USING ROLLING BEARINGS FOR PROVIDING RECTILINEAR MOTION

[75] Inventor: Kazuhiko Tanaka, Yokohama, Japan

[73] Assignee: Nippon Thomson Co., Ltd., Tokyo, Japan

[21] Appl. No.: 624,710

[22] Filed: Jun. 26, 1984

[30] Foreign Application Priority Data

Dec. 29, 1983 [JP]   Japan ................................ 58-245933

[51] Int. Cl.³ ............................................ F16C 29/06
[52] U.S. Cl. .................................................... 308/6 C
[58] Field of Search .................... 308/6 C, 6 R, 6 A; 464/168

[56] References Cited

U.S. PATENT DOCUMENTS

| | | | |
|---|---|---|---|
| 3,808,839 | 5/1974 | Teramachi | 464/168 |
| 4,427,240 | 1/1984 | Teramachi | 308/6 C |
| 4,441,765 | 4/1984 | Kasai | 308/6 C |
| 4,456,312 | 6/1984 | Rogers et al. | 308/6 c |

*Primary Examiner*—Lenard A. Footland

*Attorney, Agent, or Firm*—Trexler, Bushnell & Wolters, Ltd.

[57] ABSTRACT

There is disclosed an infinite circuit using rolling bearings for providing the rectilinear motion. This circuit comprises: rolling elements consisting of rollers or balls; rolling bearings, constituted by the rolling elements, for providing the infinite rectilinear motion by endlessly circulating the rolling elements in an infinite circuit while keeping the direct contact relation with each other; rectilinear track and return passages; two direction reversing passages which connect both ends thereof. The direction reversing passage consists of two quarter-circular passages and an intermediate rectilinear passage provided therebetween. The cross section of each rolling element has the same diameter. In this invention, the traveling amount of each rolling element at each position in the infinite circuit can be made uniform, thereby minimizing the stick slip of the rolling elements while they are rolling in the circuit, so that it is possible to obtain the infinite circuit with less sliding resistance. Also, the moving direction of the rolling elements can be smoothly reversed.

4 Claims, 41 Drawing Figures

INFINITE CIRCUIT USING ROLLING BEARINGS FOR PROVIDING RECTILINEAR MOTION

BACKGROUND OF THE INVENTION

The present invention relates to rolling bearings in which rollers or balls are used as rolling elements and the infinite rectilinear motion is provided by endlessly circulating those rolling elements.

As the rolling bearings for providing the infinite rectilinear motion, the following arts have been conventionally proposed: namely, as shown in FIG. 29, the rollers of single row are used as the rolling elements (refer to Japanese Utility Model Application No. 61971/1980); as shown in FIG. 30, the rollers of total four rows consisting of respective two rows on the right and left sides are used as the rolling elements (refer to Japanese Patent Application Laid-open No. 622/1983); as shown in FIG. 31, the rollers of three rows are used as the rolling elements (refer to Japanese Patent Application Laid-open No. 101121/1982); as shown in FIG. 32, the balls of four rows are used as the rolling elements (refer to Japanese Patent Application Laid-open No. 72912/1980); and as shown in FIG. 33, the balls of six rows are used as the rolling elements (refer to Japanese Patent Application Laid-open No. 29936/1973), etc.

Any of the above-mentioned bearings belongs to the technical field of the rolling bearings for providing the endless rectilinear motion of the present invention.

The common points regarding the construction of the bearings of the foregoing prior arts are as follows.

(i) Rollers 30, 31 and 32, or balls 33 and 34 are used as the rolling elements.

(ii) The infinite circuits comprise: rectilinear track passages 35, 36, 37, 38, and 39 in the regions where some weight is applied thereto; rectilinear return passages 40, 41, 42, 43, and 44 in the regions where no weight is applied thereto; and direction reversing passages 45, 46, 47, 48, and 49 on both sides which respectively couple both ends of both rectilinear passages, thereby smoothly reversing the traveling direction of the rolling elements. The axial central line which passes on the centers of the cross sections perpendicular to the rolling direction of the rolling elements at each portion of the infinite circuit (therefore, the rolling locus of the centers of the rolling elements which roll in the infinite circuit) is located on the axial central plane as the same plane. This axial central plane is the plane which is perpendicular to the rolling axis of each roll in the case where the rolling elements are the rollers and it is the plane which passes through the center of each ball in the case where the rolling elements are the balls. Therefore, in the case where the infinite circuit is cut along the axial central plane, the rolling elements in the infinite circuit are represented as the cross sections of the circles having the same diameter which are sequential in the contact relation with each other as illustrated in FIGS. 1, 2, 30(C), 30(D), 31(B), and 32(B), etc.

The conventional rolling bearings as described above relatively satisfy the performances of the bearings such as service life, coefficient of friction, sliding resistance, and the like and are therefore used as the bearings for providing the rectilinear motion at the rectilinear moving portions of various equipment. However, recently, the development of the rolling bearings for the rectilinear motion whereby the sliding resistance is lower and the coefficient of friction is smaller than those of the conventional bearings is required.

In the conventional rolling bearings for the rectilinear motion, the infinite circuit is formed as an arbitrary proper construction. Thus, even if the degree of finishing accuracy of each part of the infinite circuit is improved, the stick slip as the bearings cannot be reduced, so that the sliding resistance as the entire bearings cannot be decreased. Particularly, in the case where the rollers 30, 31 and 32 are used as the rolling elements as shown in FIGS. 29, 30 and 31, and in case of the bearings having the complicated constructions whereby the rolling elements are endlessly circulated on track rails 51 and 53 along the track passages 36 and 38 of four rows as shown in FIGS. 30 and 32, the sliding resistance is increased due to the occurrence of a larger stick slip. Therefore, it is demanded to solve the occurrence of stick slip.

SUMMARY OF THE INVENTION

It is an object of the present invention to provide rolling bearing of the rectilinear motion whereby the sliding resistance of the bearings during the rectilinear motion due to the occurrence of the stick slip of the rolling elements which roll in the infinite circuit is extremely small.

According to the present invention, various studies have been made to find out and solve the causes of such stick slip which is a large factor of the increase in the above-mentioned sliding resistance of bearings, thereby intending to obtain the construction of the endless circuit with less sliding resistance. The above object is accomplished by an ideal infinite circuit whereby the traveling amount at each location of each rolling element in the infinite circuit becomes more uniform.

The above and other objects, features and advantages of the present invention will be apparent from the following detailed description in conjunction with the accompanying drawings.

The consideration is made with regard to one rolling cycle of the rolling elements 4 which are adjacent to each other in the region from the position where a center 6 of the rolling element ② is located on the straight line AB to the position where a center 5 of the rolling element ① comes onto the line AB.

Figure 3:
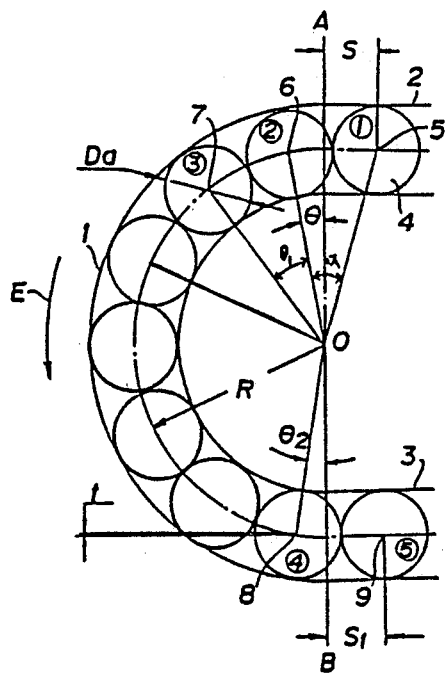
FIG. 3 is a diagram showing the positional relation of the rolling elements in the semicircular direction reversing passage.

As shown in FIG. 3, it is now assumed that a distance between the center 5 of the rolling element ① and the line AB is S; a distance between the center 6 of the rolling element ⑤ and the line AB is $S_1$; an angle (5, 0, 6) is $\alpha$; an angle (A, 0, 6) is $\theta$; an angle (6, 0, 7) is $\theta_1$; and an angle (B, 0, 8) is $\theta_2$, respectively. The angle $\theta_1$ corresponds to the central angle between the centers of the adjacent rolling elements 4 and 4 which are in the contact relation with each other in the direction reversing passage 1 and the center 0 of curvature, namely, $\theta_1$ is the pitch angle between the rolling elements and therefore it is constant. The angles of $\theta$, $\theta_2$ and $\alpha$ are varied in dependence upon the position of the rolling element 4. Also, a distance between the centers of the adjacent rolling elements 4 and 4 is always $D_a$.

In addition, a distance between the center of the rolling element ④ and the axial central straight line of the return passage 3 is set into t.

With respect to the triangle $\Delta$ (5, 0, 6), $$D_a^2 = R^2 + (R^2 + S^2) - 2R\sqrt{R^2 + S^2}\cos\alpha$$

$$\therefore \cos\alpha = \frac{2R^2 + S^2 - D_a^2}{2R\sqrt{R^2 + S^2}}$$

$$\alpha = \cos^{-1}\left(\frac{2R^2 + S^2 - D_a^2}{2R\sqrt{R^2 + S^2}}\right)$$

$$\therefore \theta = \cos^{-1}\left(\frac{2R^2 + S^2 - D_a^2}{2R\sqrt{R^2 + S^2}}\right) - \tan^{-1}(S/R)$$

On the other hand, with regard to the triangle $\Delta$ (6, 0, 7), $$\sin\frac{\theta_1}{2} = \frac{D_a/2}{R}$$

$$\therefore \theta_1 = 2\sin^{-1}\left(\frac{D_a}{2R}\right)$$

Now, assuming that $$\left.\begin{array}{l}S_1 = l \times D_a \\ R = n \times D_a \\ S = m \times D_a\end{array}\right\}$$

we will have $0 \leq l \leq 1$ and $0 \leq m \leq 1$, where l, n and m are dimensionless values. Therefore, $\theta_1$ and $\theta$ are represented by the following expressions.

$$\theta_1 = 2\sin^{-1}\left(\frac{1}{2n}\right) \tag{1}$$

$$\theta = \cos^{-1}\left(\frac{2n^2 + m^2 - 1}{2n\sqrt{n^2 + m^2}}\right) - \tan^{-1}(m/n) \tag{2}$$

When assuming that N is the number (integer) of $\theta_1$ in the direction reversing passage 1, $$\theta_2 = 180° - \theta - N\theta_1 \tag{3}$$

In addition, at the positions of the rolling elements ④ and ⑤, $$t = R - R\cos\theta_2 \tag{4}$$

$$t^2 + (S_1 + R\sin\theta_2)^2 = D_a^2$$

Therefore, $$S_1 = \sqrt{D_a^2 - t^2} - R\sin\theta_2$$

$$= \sqrt{D_a^2 - R^2(1 - \cos\theta_2)^2} - R\sin\theta_2$$

Thus, $$l = \sqrt{1 - n^2(1 - \cos\theta_2)^2} - n\sin\theta_2$$

The present inventors have found that the rolling element ④ doesn't roll into the return passage 3 at a constant speed even when the rolling element ① rolls and moves from the track passage 2 into the direction reversing passage 1 at a constant speed and have found out that this phenomenon is a cause of the stick slip of the rolling elements 4 in the infinite circuit. After various studies, the inventors could obtain the rolling bearings for providing the rectilinear motion in which the stick slip is smaller and therefore the sliding resistance is extremely small.

The above-mentioned phenomenon will now be discussed hereinbelow.

Using the above expressions (1) to (4), the number of rolling elements 4 in the direction reversing passage 1 at each position of the rolling element ① when m is varied within a range of 0 to 1 with respect to one rolling cycle of the rolling element ①, namely, a value of N is obtained, and $\theta_2$ is calculated, and a value of (m+l) at each position of the rolling element ①, i.e., $(S_1+S_2)$ is calculated, then the difference $[(S_1+S_2)_{max}-(S_1+S_2)_{min}]$ between the maximum value and the minimum value of (m+l) under such conditions is obtained. A magnitude of this difference depends upon the relation between the diameter $D_a$ of the rolling element and the axial central radius R of curvature of the direction reversing passage. When the above-mentioned difference is small, the endless circuit in which the occurrence of the stick slip is small is provided.

Figure 11:
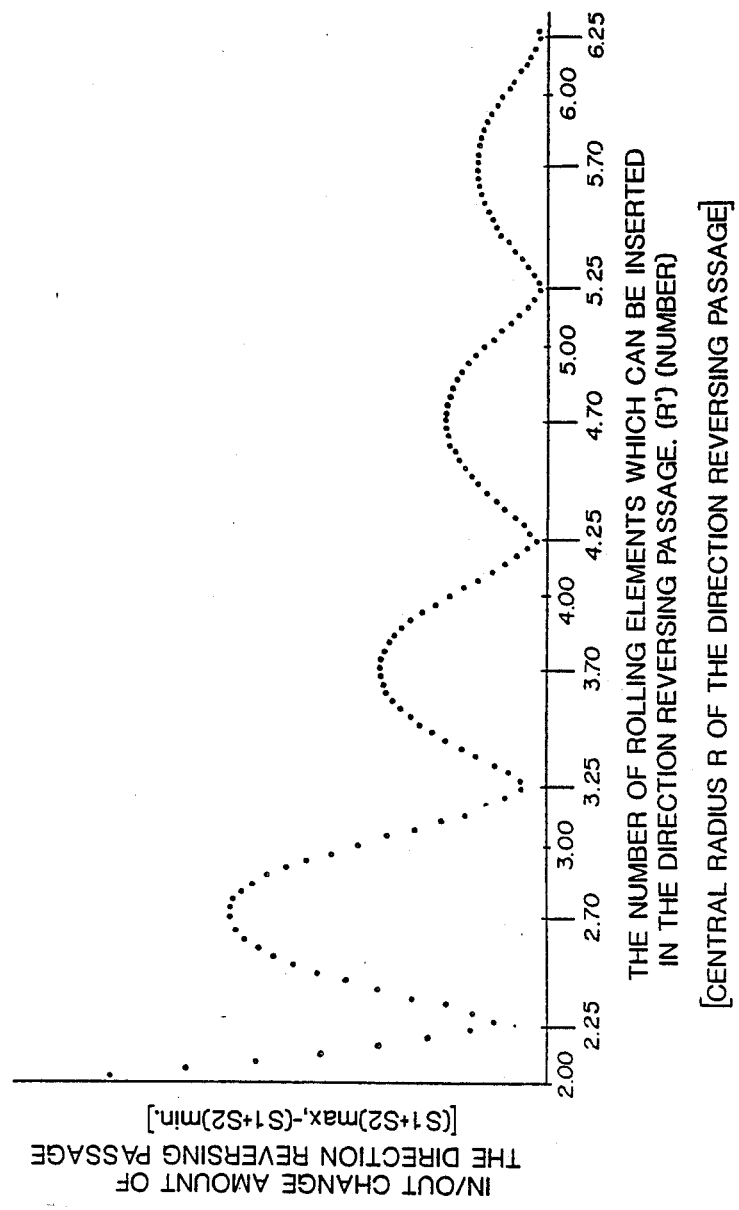
FIG. 11 is a graph showing the relation between the number of rolling elements in the direction reversing passage and the amount of change of the rolling elements which enter and go out of the direction reversing passage (namely, the in/out change amount)

FIG. 11 shows the difference between the maximum value and the minimum value of (m+l), namely, the in/out change amount of the direction reversing passage 1 in the case where the number of rolling elements 4 which can enter the direction reversing passage 1 is varied. In addition, the above in/out change amount used herein represents the amount of change of the rolling elements which enter and go out of the direction reversing passage 1.

As is obvious from FIG. 11, in case of the semicircular direction reversing passage 1, it is desirable to set the maximum number, i.e., R' of rolling elements 4 which can enter the direction reversing passage 1 into a value near (integer+0.25) at which the minimum value is derived.

Although only one direction reversing passage has been analyzed in the above, it is actually necessary to discuss about the whole infinite circuit including the rectilinear passages as well as the direction reversing passages.

As a result of consideration based on the above expressions, when R' of the direction reversing passage is a value within a range of the preferable condition (R'=integer+0.25) [practically, a value within a range of R'≃integer+(0.2 to 0.3) is adopted], the relation between L' and the input/out change amount is as follows. That is, although the in/out change amount is varied on the basis of a change in length of $D_a$ as one cycle, the minimum value thereof appears at a period of 0.5 $D_a$ and their minimum values are almost equal as can be seen from FIG. 11.

Figure 13:
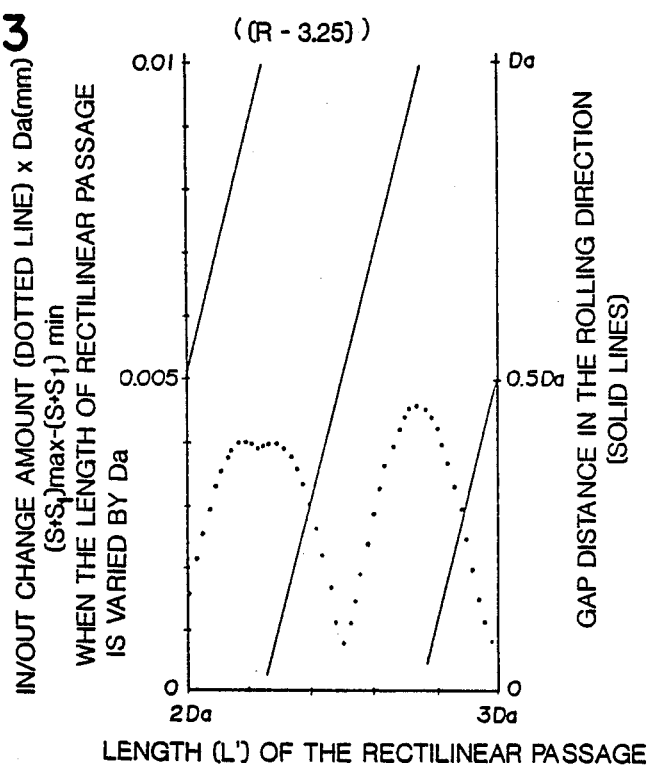
FIG. 13 is a diagram showing the relations among the in/out change amount and the gap distance in the roll- A straight line AB is located on the boundary plane among the direction reversing passage 1 and the track passage 2 and the return passage 3. A center 0 of curvature of the direction reversing passage 1 is located on the straight line AB. It is assumed that the radius of curvature of the axial center of the direction reversing passage 1 is R and that a diameter of each rolling element 4 is $D_a$.

FIG. 13 shows the in/out change amounts at one cycle in the cases where R'=3.25 and where L' lies from $2D_a$ to $3D_a$. As shown in the diagram, the minimum in/out change amounts appear at the positions where L' is $2D_a$, $2.5D_a$ and $3D_a$. The similar curves appear at every priod of $D_a$.

In addition, the gap distance in the rolling direction between the rolling elements in the infinite circuit is also shown in FIG. 13.

The rolling elements of the maximum number which can be filled in the infinite circuit are generally inserted therein. If the gap distance in the rolling direction becomes larger than the diameter $D_a$ of the rolling element with an increase in length of the rectilinear passage, one more rolling element can be further inserted in the infinite circuit; therefore, the gap distance in the rolling direction is always maintained to less than $D_a$.

Since R'=3.25 in case of the example illustrated, the total number of rolling elements in both direction reversing passages is 2R'=6.5. Thus the gap distance in the rolling direction at the position of L'=$2D_a$ is $0.5D_a$. There are two rectilinear passages consisting of the track passage and return passage, so that this causes the gap distance in the rolling direction which is twice the gap distance which will be obtained in case of the single elongated rectilinear passage. When L'=$2.25D_a$, the gap distance becomes therefore (0.5+0.25×2)=1 and the gap distance of $D_a$ is caused at this position. At this time, the gap distance will be zero by newly inserting one more rolling element. Consequently, the gap distance in the rolling direction is represented by the straight lines which are slanted upward to the right as shown in FIG. 13, namely, the lines repeatedly appear in the manner such that the gap distance together become zero when the fractions of the length of the rectilinear passage are $0.25D_a$ and $0.75D_a$ in association with a change in L' of $0.5D_a$. In this case, it is favorable since the gap distance in the rolling direction becomes zero at the position of L' where the in/out change amount becomes minimum.

As described above, in the case where R' is set into a value near (integer+0.25), by setting L' into a value of (integer+0.5×integer), it is possible to remarkably reduce the sliding resistance based on the stick slip of the rolling bearings for the rectilinear motion, so that there is no problem with respect to the gap upon rolling.

Next, the discussion will be now made with regard to the case where R' is a value other than the value near (integer+0.25) as mentioned above.

Figure 14:
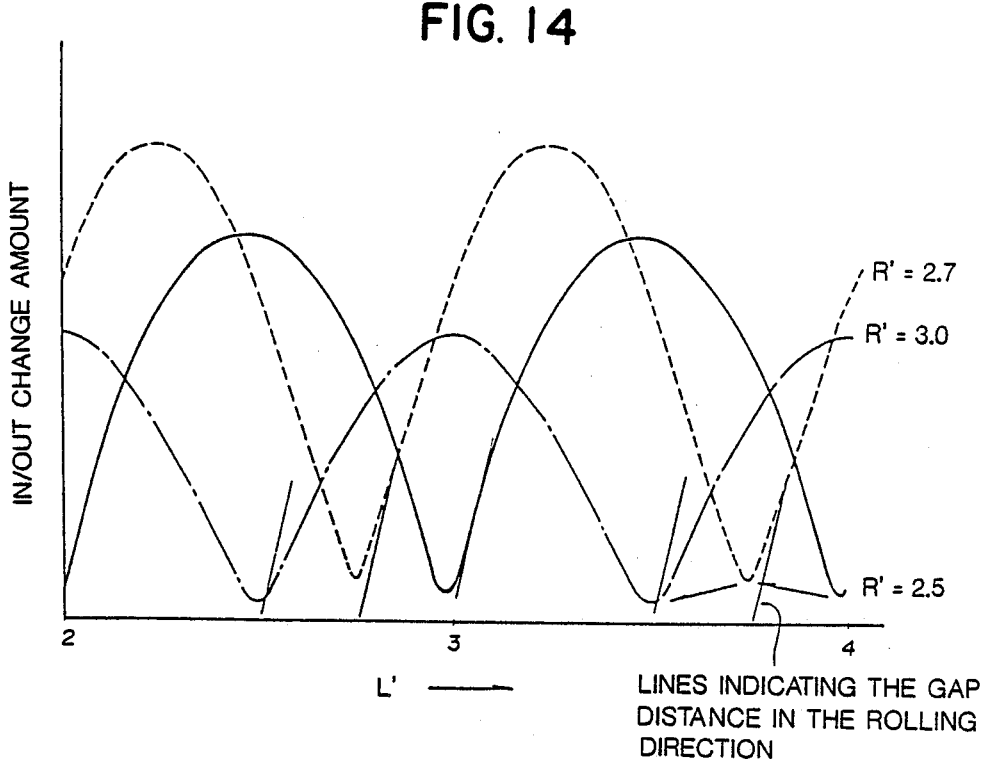

In this case, as shown in FIG. 14, the minimum value of the in/out change amount periodically appears at the positions corresponding to the cycle of $D_a$ in association with a change in L'. With an increase in the value of R', the position of minimum value is moved in the direction of L'=0 (to the left in FIG. 14). FIG. 14 shows three examples when R' is 2.5, 2.75 and 3.0. It can be seen that the curves having the cycle of $D_a$ are moved to the left with an increase in R'. In addition, parts of the lines indicating the gap distance in the rolling direction near the minimum values in the cases of the respective curves are together shown.

For instance, when R'=2.5, the gap indicating lines are the straight lines in the case where the gap distance becomes zero when L'=2, 3 and 4. When R'=2.75, the gap indicating lines are the straight lines in the case where the gap distance becomes zero when L'=2.75 and 3.75. When R'=3.0, the gap indicating lines are the straight lines in the case where the gap distance becomes zero when L'=2.5 and 3.5.

Figure 12:
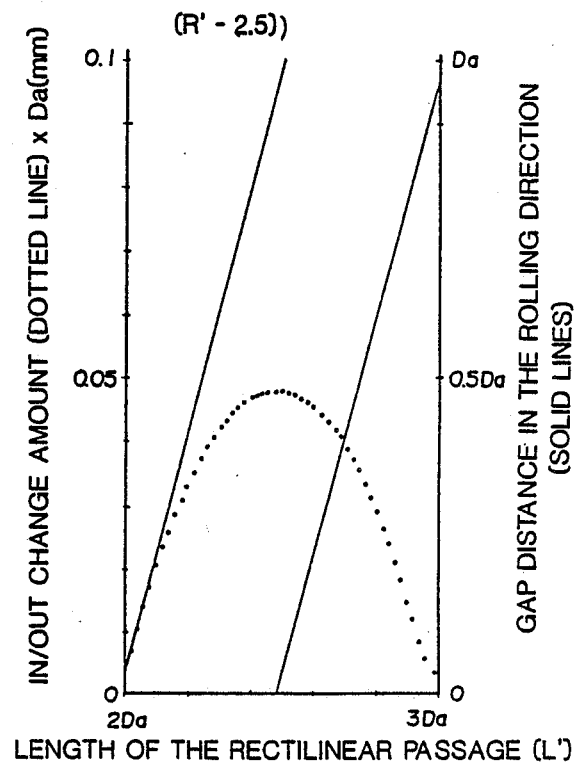
FIG. 12 is a diagram showing the relations among the in/out change amount and the gap distance in the rolling direction and the length of one cycle of the rectilinear passage when $R'=2.5$.

FIG. 12 shows the curve representative of the in/out change amount of one cycle in a range where L'=$2D_a$ to $3D_a$ when R'=2.5 and the gap indicating lines in the rolling directions. The in/out change amount curve is the curve such that the in/out change amount becomes minimum when L' is $2D_a$ and $3D_a$ and it becomes maximum when L' is $2.5D_a$.

Similarly as mentioned above, the gap indicating lines are represented as the straight lines such that the gap distance becomes zero when L'=$2D_a$, $2.5D_a$ and $3D_a$. The consideration will be further made with respect to the case where R' is a value other than the value near (integer+0.25).

When L''=0.5−R'' (where 0≦L''≦0.5 and 0≦R''≦0.5) and R' is a value represented by (integer+α), if a value of R'' is set as follows; namely, R''=α in a range of 0≦α≦0.5, and
R''=−1+α in a range of 0.5<α<1.0, and if L' is set into a value near L'=integer+L''=integer+0.5−R'', it is possible to remarkably reduce the sliding resistance of the rolling bearings for the rectilinear motion. This is the second method of such reduction in the sliding resistance. In this case, the lengths of the rectilinear passage becomes the values of (integer+L')×$D_a$, respectively. As shown in FIGS. 12 and 14 also, in this case, there occurs a problem such that the gap distance in the rolling direction becomes 0 (or $D_a$) at the position of the value of L' where the in/out change amount becomes the minimum value. However, it is actually undesirable to adopt the rolling bearings whereby the gap distance in the rolling direction is 0. Therefore, it is necessary to actually select L' into the position that is slightly apart from the minimum value of the in/out change amount, namely, into the position where the gap distance in the rolling direction is not 0.

Figure 15:
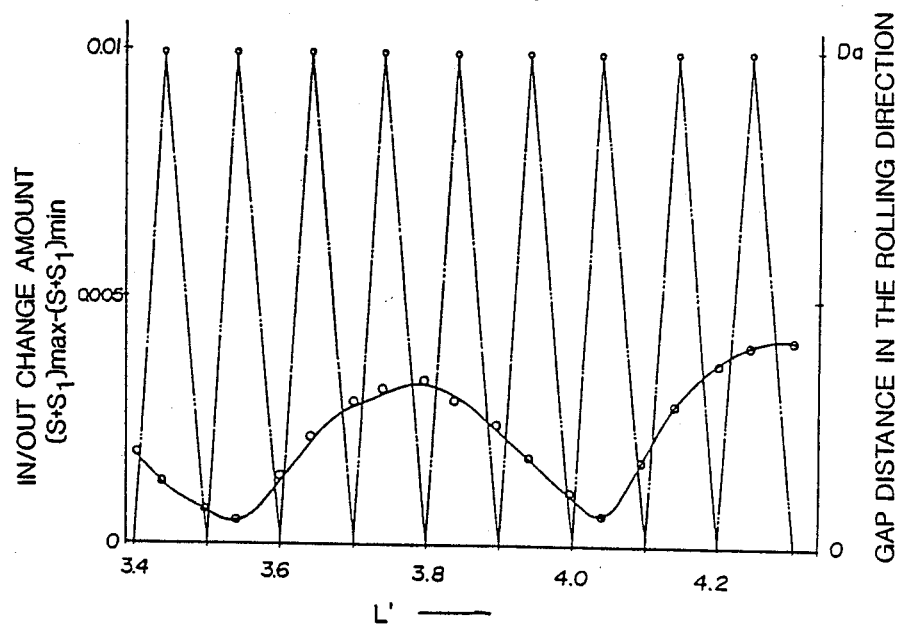

FIG. 15 shows the relation between the gap distance in the rolling direction and the value of L' at which the in/out change amount becomes the minimum value when R' is varied from 3.35 to 4.3.

In the case where R' is a value other than the value near (integer+0.25), the values of L' at which the in/out change amount becomes minimum are always located near the positions where the gap distance in the rolling direction is $D_a$ or 0. Due to this, it is actually difficult to manage the dimensions in selection of L' in consideration of the occurrence of errors upon manufacturing the bearings. Therefore, by setting the length of rectilinear passage on the basis of the value obtained by adding a value of the order of approx. ±0.1 to the value of L' obtained, it is possible to manage the dimensions of practical bearings with some clearance whereby the in/out change amount is near the minimum value and the gap distance in the rolling direction is not 0. Also, it is also possible to cheaply manufacture the bearings having extremely small sliding resistance since there is no need to perform the severe management of dimensions upon production.

In addition, in the above description, the number of rolling elements as the rolling bearings has been set into the maximum number of rolling elements which can be filled in the infinite circuit formed in the manner as described above; however, it is a logical result when considering the nature of bearings such that the loading ability of bearings increases with an increase in number of rolling elements.

Figure 16:
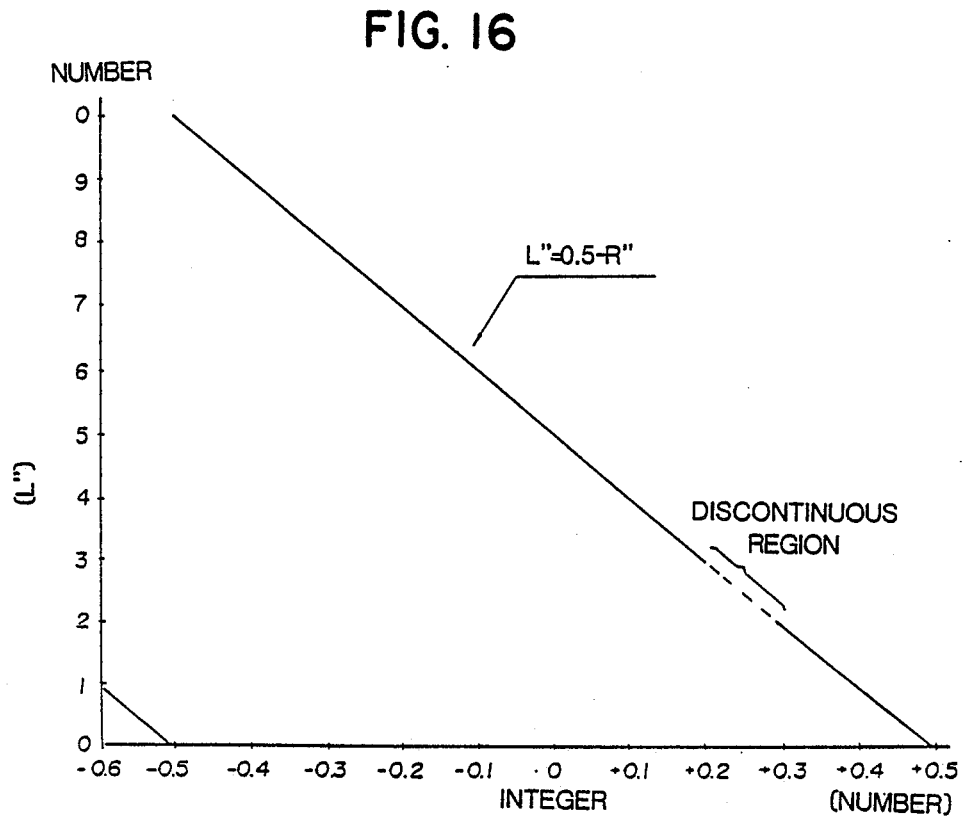

FIG. 16 is a diagram showing the relation of $L''=0.5-R''$ mentioned above.

As already mentioned before, by allowing latitude of about $\pm 0.1 D_a$ to the length L of track passage, the infinite circuit can be actually designed with latitude. That is, L'' is set into $0.5-R''\pm 0.1$. As shown in FIG. 16, the discontinuous region appears near $R''=0.25$ and the data of L'' is not located on the straight line. Namely, the diagram of FIG. 16 shows the relation when R'' is not the value near 0.25.

Figure 1:
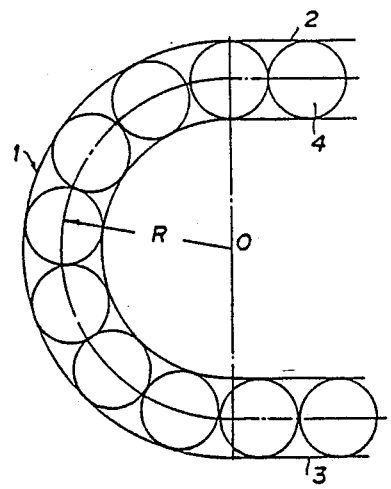
FIG. 1 shows a partial axial central cross sectional view of an infinite circuit in which a direction reversing passage consists of a semicircular passage.
Figure 2:
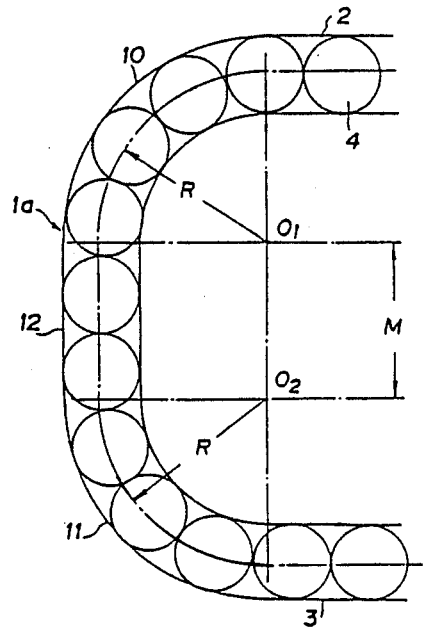
FIG. 2 shows a partial axial central cross sectional view of an infinite circuit in which a direction reversing passage consists of two quarter-circular passages and an intermediate rectilinear passage.
Figure 4:
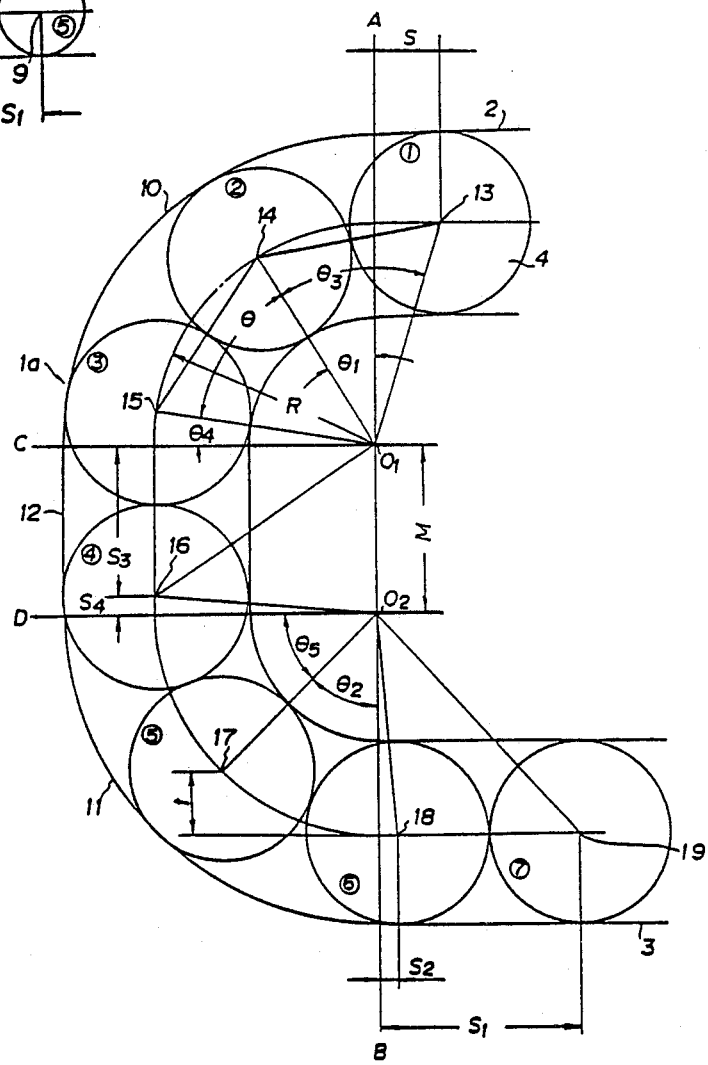
FIG. 4 is a diagram showing the positional relation of the rolling elements in the direction reversing passage which consists of two quarter-circular passages and an intermediate rectilinear passage.

Next, the discussion will be made with regard to the case where, as shown in FIGS. 2 and 4, a direction reversing passage 1a comprises: a first arc passage 10 and a second arc passage 11 each of which is a quarter-circle passage, respectively; and an intermediate rectilinear passage 12 provided between the arc passages 10 and 11.

Each rolling element 4 enters the first arc passage 10 of the direction reversing passage 1a from the track passage 2 and passes through the intermediate rectilinear passage 12 and second arc passage 11 and rolls out to the return passage 3. A length of the intermediate rectilinear passage 12 is set into M and each radius of curvature of the axial centers of the quarter-circular passages 10 and 11 is set into R.

As shown in FIG. 4, a reference numeral ① is marked to the rolling element 4 in the track passage 2 among the rolling elements 4 in the similar manner as in FIG. 3. Also, ②, ③, ④, ⑤, ⑥, and ⑦ are sequentially marked to the adjacent rolling elements 4 in the direction reversing passage 1a and in the return passage 3, respectively. In the example illustrated, the rolling elements ② and ③ among the rolling elements 4 are present in the 1st arc passage 10; the element ④ among the rolling elements 4 is present in the intermediate rectilinear passage 12; the rolling element ⑤ is present in the 2nd arc passage 11; and the rolling elements ⑥ and ⑦ are present in the return passage 3. The rolling element ⑦ has been completely rolled out into the return passage 3. Similarly to FIG. 3, the straight line AB is located on the boundary plane among the direction reversing passage 1a and the track passage 2 and the return passage 3. It is now assumed that centers $O_1$ and $O_2$ of curvature of the 1st and 2nd arc passages 10 and 11 are both located on the straight line AB, respectively. Also, the centers of the rolling elements ① to ⑦ are sequentially set into 13 to 19, respectively. The distance between the rolling element ① and the line AB is set into S. The distance between the rolling element ⑦ and the line AB is set into $S_1$. It will be explained hereinbelow the rolling of the rolling element ①, accordingly, a change in rolling of the rolling element ⑦ when S is varied, namely, the process of calculation of the change in $S_1$.

As already mentioned before, an angle (14, $O_1$, 15)$=\theta$ is similarly constant. Namely, $$\theta = 2 \sin^{-1}(D_a/2R) \quad (\text{constant}) \tag{5}$$

The case where the rolling elements 4 enter the direction reversing passage 1a from the track passage 2 will then be considered.

As illustrated in FIG. 4, it is assumed that the angle (13, $O_1$, 14)$=\theta_3$ and the angle (A, $O_1$, 14)$=\theta_1$. Straight lines $O_1C$ and $O_2D$ are drawn respectively from $O_1$ and $O_2$ in parallel with the axial central lines of the track passage 2 and return passage 3. It is also assumed that the angle (15, $O_1$, C)$=\theta_4$, the angle (17, $O_2$, D)$=\theta_5$, and the angle (17, $O_2$, B)$=\theta_2$. When considering the triangle $\Delta(O_1, 13, 14)$, $$Da^2 = R^2 + (R^2 + S^2) - 2R\sqrt{R^2 + S^2}\cos\theta_3 \tag{6}$$

similarly as mentioned before. Therefore, $$\theta_1 = \cos^{-1}\frac{2R^2 + S^2 - Da^2}{2R\sqrt{R^2 + S^2}} - \tan^{-1}(S/R) \tag{7}$$

In addition, as shown in FIG. 4, the distances between the center 16 of the rolling element ④ in the intermediate rectilinear passage 12 and the straight lines $O_1C$ and between the element ④ and the straight line $O_2D$ are set into $S_3$ and $S_4$, respectively. The distance between the center 17 of the rolling element ⑤ right before it rolls from the 2nd arc passage 11 into the return passage 3 and the axial center of the return passage 3 is t. We will have $$t = R - R\cos\theta_2 \tag{8}$$

$$S_2 = \sqrt{Da^2 - t^2} - R\sin\theta_2 \tag{9}$$

$$= \sqrt{Da^2 - R^2(1 - \cos\theta_2)^2} - R\sin\theta_2$$

In addition, $$S_1 = S_2 + Da \tag{10}$$

$$\theta_1 + \theta + \theta_4 = 90° \tag{11}$$

$$S_3 + S_4 = M \tag{12}$$

$$\theta_5 + \theta_2 = 90° \tag{13}$$

By use of the above expressions, $S_1$ is calculated with respect to one rolling cycle of the rolling elements 4 in the case where S is varied from O to $D_a$. The calculation is carried out in accordance with the following steps (s1) to (s8).

(s1) Obtain $\theta_1$ from expression (7).
(s2) Since $\theta_4 = 90° - \theta - \theta_1$ from expression (11), obtain $\theta_4$ from this expression.
(s3) Since $$S_3 = D_a - R \sin \theta_4, \tag{14}$$

obtain $S_3$ from this expression.
(s4) Since $S_4 = M - S_3$ from expression (12), obtain $S_4$ from this expression.
(s5) Since $$\theta = \theta_5 + \sin^{-1}(S_4/R), \tag{15}$$

obtain $\theta_5$ from this expression (15).
(s6) Obtain $\theta_2$ from expression (13).
(s7) obtain $S_2$ from expression (9).
(s8) Obtain $S_1$ from expression (10).

The traveling length of $S + S_1$ is obtained in the cases where the number of rolling elements 4 in the track passage 2, direction reversing passage 1a and return passge 3 is varied and where the position of each rolling element 4 is changed on the basis of the above calculation steps.

There are many various cases with respect to the positional relations of the respective rolling elments 4 which exist in the direction reversing passage 1a having the intermediate rectilinear passage 12 in dependence upon the respective values of the diameter $D_a$ of the rolling element, radius R of curvature of arc, and distance M of intermediate rectilinear passage. Each of the typical cases will now be considered hereinbelow.

Figure 5:
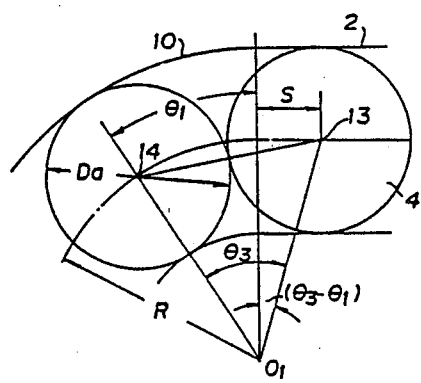
FIGS. 5 to 10 are diagrams showing the partial positional relations of the rolling elements shown in FIG. 4.

(I) As shown in FIG. 5, in the case where the rolling elements 4 enter the 1st arc passage 10 from the track passage 2:

The triangle $\Delta(O_1, 13, 14)$ is now considered. From expression (6) mentioned before, i.e., $$R^2 + R^2 + S^2 - 2R\sqrt{R^2 + S^2} \cos\theta_3 = D_a^2, \tag{6}$$

$\theta_3$ and $\theta_1$ are obtained. That is, $$\theta_1 = \theta_3 - (\theta_3 - \theta_1) \tag{7}$$

$$\cos\theta_3 = \frac{2R^2 + S^2 - D_a^2}{2R\sqrt{R^2 + S^2}}$$

$$\tan(\theta_3 - \theta_1) = \frac{S}{R}$$

$$\therefore \theta_1 = \cos^{-1}\left(\frac{2R^2 + S^2 - D_a^2}{2R\sqrt{R^2 + S^2}}\right) - \tan^{-1}\left(\frac{S}{R}\right)$$

(mentioned before).

Figure 6:
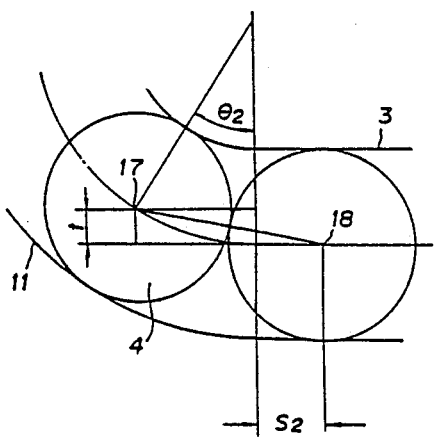

(II) As shown in FIG. 6, in the case where the rolling elements 4 enter the return passage 3 from the 2d arc passage 11:

$$t = R - R\cos\theta_2 \tag{8}$$

$$S_2 = \sqrt{D_a^2 - t^2} - R\sin\theta_2 \tag{9}$$

$$= \sqrt{D_a^2 - R^2(1 - \cos\theta_2)^2} - R\sin\theta_2$$

-continued
(mentioned before).

Figure 7:
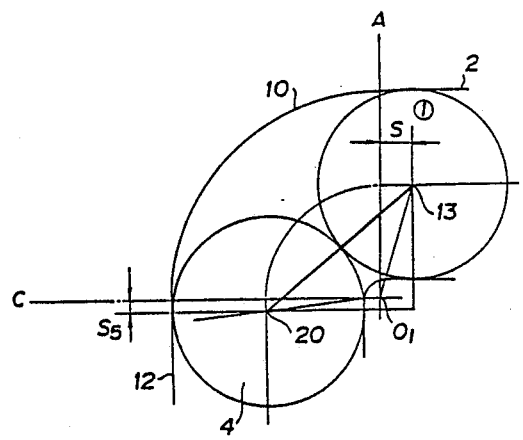

(III) As shown in FIG. 7, when R is slightly larger than $D_a/2$ and, therefore, in the case where more than half of the preceding rolling element 4 adjacent the rolling element ① which is located near the end of the track passage 2 has exceeded the 1st arc passage 10 and rolled in the intermediate rectilinear passage 12:

Assuming that the center of the rolling element 4 in the intermediate rectilinear passage 12 is 20 and that the distance between the center 20 and the straight line $O_1C$ is $S_5$, from expression $$D_a^2 = (R + S)^2 + (R + S_5)^2$$

we will have $$S_5 = \sqrt{D_a^2 - (R + S)^2} - R \tag{16}$$

Thus, $S_5$ will be obtained from expression (16).

Figure 8:
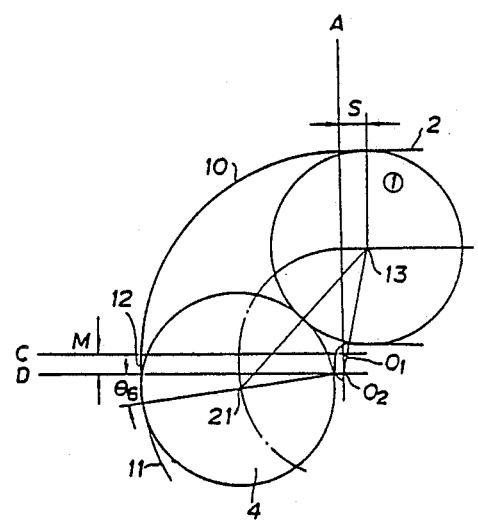

(IV) As shown in FIG. 8, when R is slightly larger than $D_a/2$ and M is smaller than $D_a/2$ and, therefore, in the case where more than half of the preceding rolling element 4 adjacent the rolling element ① which is located near the end of the track passage 2 has exceeded the 1st arc passage 10 and intermediate rectilinear passage 12 and rolled in the 2nd arc passage 11:

Assuming that the center of the rolling element 4 in the 2nd arc passage 11 is 21 and that the angle between the straight line $O_2D$ and the straight line which connects the center 21 and the center $O_2$ of curvature is $\theta_6$, $$\overline{O_2 \cdot 13} = \sqrt{S^2 + (R + M)^2}$$

When considering the triangle $\Delta(13, O_2, 21)$, $$\overline{13 \cdot 21} = D_a \tag{17}$$

$$\overline{O_2 \cdot 13} = R$$

$$\therefore D_a^2 = R^2 + \{S^2 + (R + M)^2\} -$$

$$2R\sqrt{S^2 + (R + M)^2} \cos\angle(13 \cdot O_2 \cdot 21)$$

$$\therefore \angle(13 \cdot O_2 \cdot 21) = \cos^{-1}\left(\frac{R^2 + S^2 + (R + M)^2 - D_a^2}{2R\sqrt{S^2 + (R + M)^2}}\right)$$

$$\angle(13 \cdot O_2 \cdot A) = \tan^{-1}\left(\frac{S}{R + M}\right)$$

$$\therefore \theta_6 = \angle(13 \cdot O_2 \cdot 21) - 90° - \angle(13 \cdot O_2 \cdot A)$$

Thus, $\theta_6$ can be obtained from expression (17), wherein $\theta_6$ corresponds to $\theta_5$ in FIG. 4.

Figure 9:
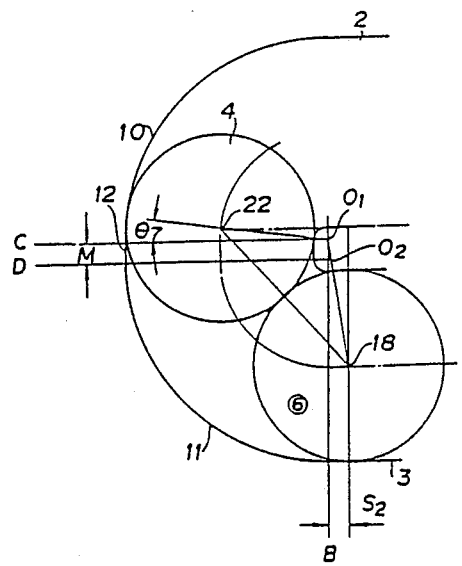

(V) As shown in FIG. 9, when R is slightly larger than $D_a/2$ and M is smaller than $D_a/2$ and, therfore, in the case where more than half of the following rolling element 4 adjacent to the rolling element ⑥ which has rolled out near the end of the return passage 3 still remains in the 1st arc passage 10;

Assuming that the center of the rolling element 4 in the 1st arc passage 10 is 22 and that the angle between the straight line $O_2C$ and the line which connects the center 22 and the center $O_1$ of curvature is $\theta_7$, $$\overline{22 \cdot 18} = D_a \quad (18)$$

$$D_a{}^2 = (R \cos \theta_7 + S_2)^2 + (R \sin \theta_7 + M + R)^2$$

$$S_2 = \sqrt{D_a{}^2 - (R \sin \theta_7 + M + R)^2} - R \cos \theta_7$$

Thus, $S_2$ can be obtained from expression (18), wherein $\theta_7$ corresponds to $\theta_4$ in FIG. 4.

Figure 10:
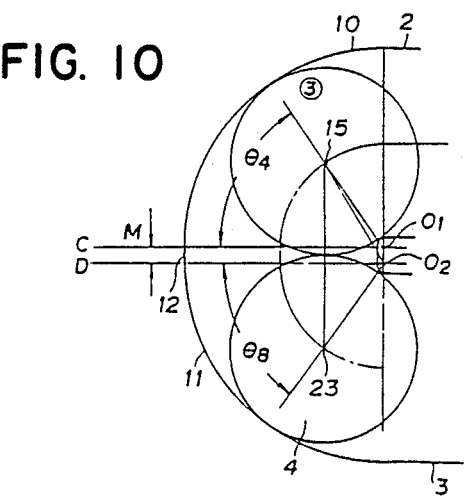

(IV) As shown in FIG. 10, when R is slightly larger than $D_a/2$ and M is smaller than $D_a/2$ and, therefore, in the case where the preceding rolling element 4 adjacent to the rolling element ③ in the 1st arc passage 10 has exceeded the intermediate rectilinear passage 12 and rolled into the 2nd arc passage 11:

Assuming that the center of the rolling element 4 in the 2nd arc passage 11 is 23 and that the angle between the straight line $O_2D$ and the line which connects the center 23 and the center $0_2$ of curvature $\theta_8$, $$(\overline{0_2 \cdot 15})^2 = (R \cos \theta_4)^2 + (R \sin \theta_4 + M)^2$$

$$(\overline{15 \cdot 23}) = D_a$$

Therefore, $$D_a{}^2 = (\overline{0_2 \cdot 15})^2 + R^2 - 2R \,\overline{0_2 \cdot 15}\, \cos 角(15 \cdot 0_2 \cdot 23) \quad (19)$$

$$角(15 \cdot 0_2 \cdot 23) = 角(15 \cdot 0_2 \cdot D) + \theta_8$$

$$\theta_8 = \cos^{-1} \frac{(R \cos \theta_4)^2 + (R \sin \theta_4 + M)^2 + R^2 - D_a{}^2}{2R\sqrt{(R \cos \theta_4)^2 + (R \sin \theta_4 + M)^2}} -$$

$$\cos^{-1} \frac{R \cos \theta_4}{\sqrt{(R \cos \theta_4)^2 + (R \sin \theta_4 + M)^2}}$$

Thus, $\theta_8$ can be obtained from expression (19), wherein $\theta_8$ corresponds to $\theta_5$ in FIG. 4.

In the case where the direction reversing passage has the intermediate rectilinear passage, such a direction reversing passage will now be analyzed using the above expressions (7), (9), (16), (17), (18), and (19). Thus, the following conclusion is derived.

Figure 17:
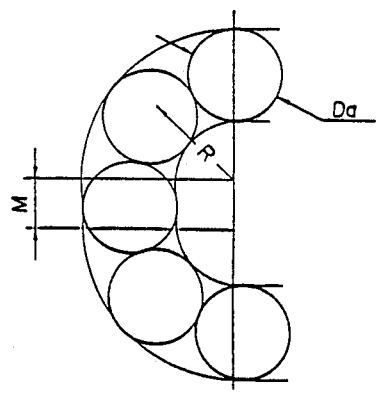
Figure 18:
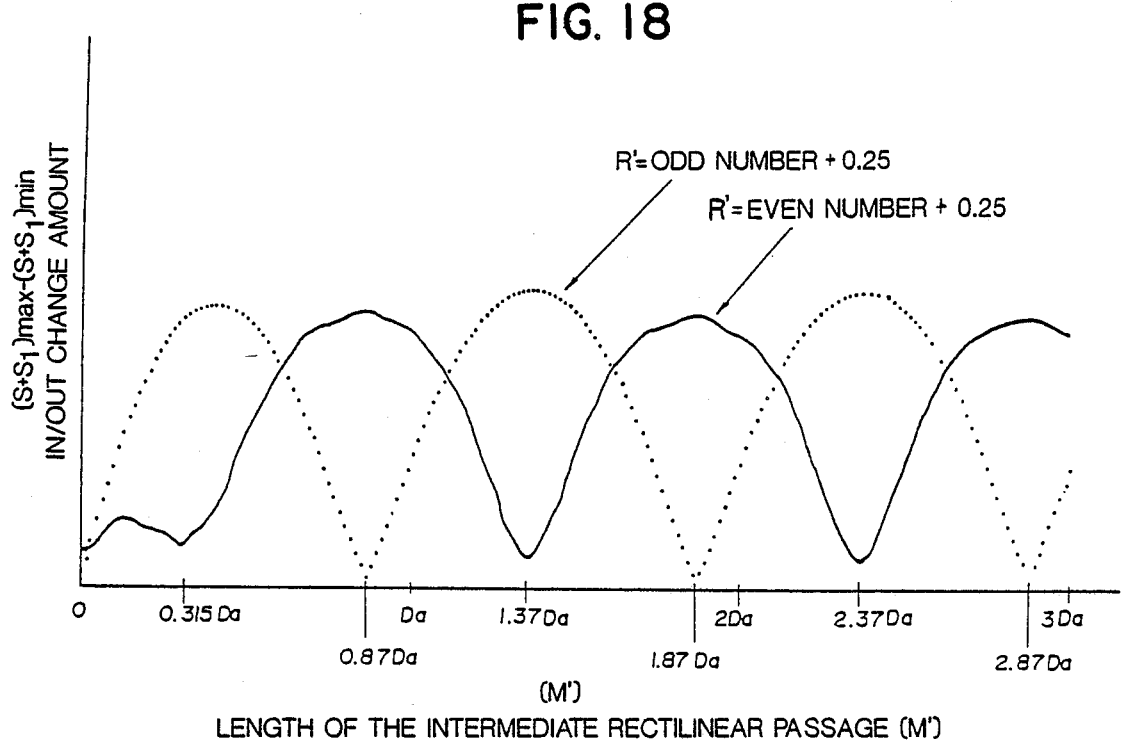

As shown in FIG. 17, in case of the direction reversing passage which was formed such that the number R' of rolling elements which can be inserted in both quarter-circular passages is (integer+0.25), the in/out change amount when the length M' (=M/D$_a$) of the intermediate rectilinear passage is changed is represented by the curves which differ when R' is (odd number+0.25) and (even number+0.25) as shown in FIG. 18.

It is desirable to set M' into a value near (integer+0.87) when R' is a value near (odd number+0.25) since the in/out change amount becomes substantially minimum.

When R' is a value near (even number+0.25), it is preferable to set a value of M' into a value near (integer+0.37) since the in/out change amount becomes substantially minimum. However, in case of the short intermediate rectilinear passage wherein a value of M' is less than 0.5, the in/out change amount becomes almost minimum at the position where M' is 0.315 instead of 0.37 as can be seen from FIG. 18, although this value differs depending upon the relations among M, R and D$_a$.

Figure 19:
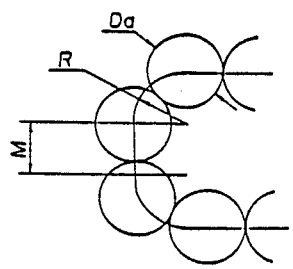
Figure 20:
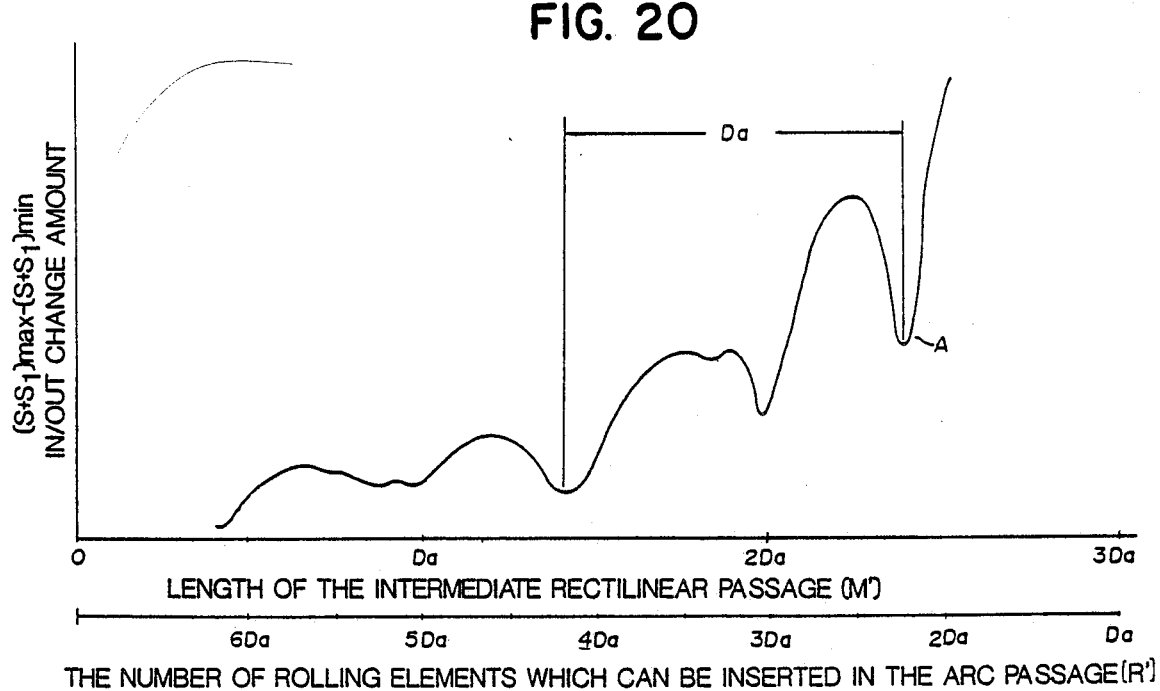

Next, when R'≠(integer+0.25), for example, in case of the relation as shown in FIG. 19, the in/out change amount with respect to changes in M' and R' is as indicated by the curve shown in FIG. 20.

Similarly to the graphs shown in FIG. 14, the minimum change amount appears at a period of D$_a$ with a change in L' and the position of the minimum value on L' is moved in the direction of L'=0 with an increase in R'. FIG. 20 shows the waveform curve in which the points indicative of those minimum change amounts were plotted in the similar manner as FIG. 15 while increasing R' from 2 to 6.

Figure 21:
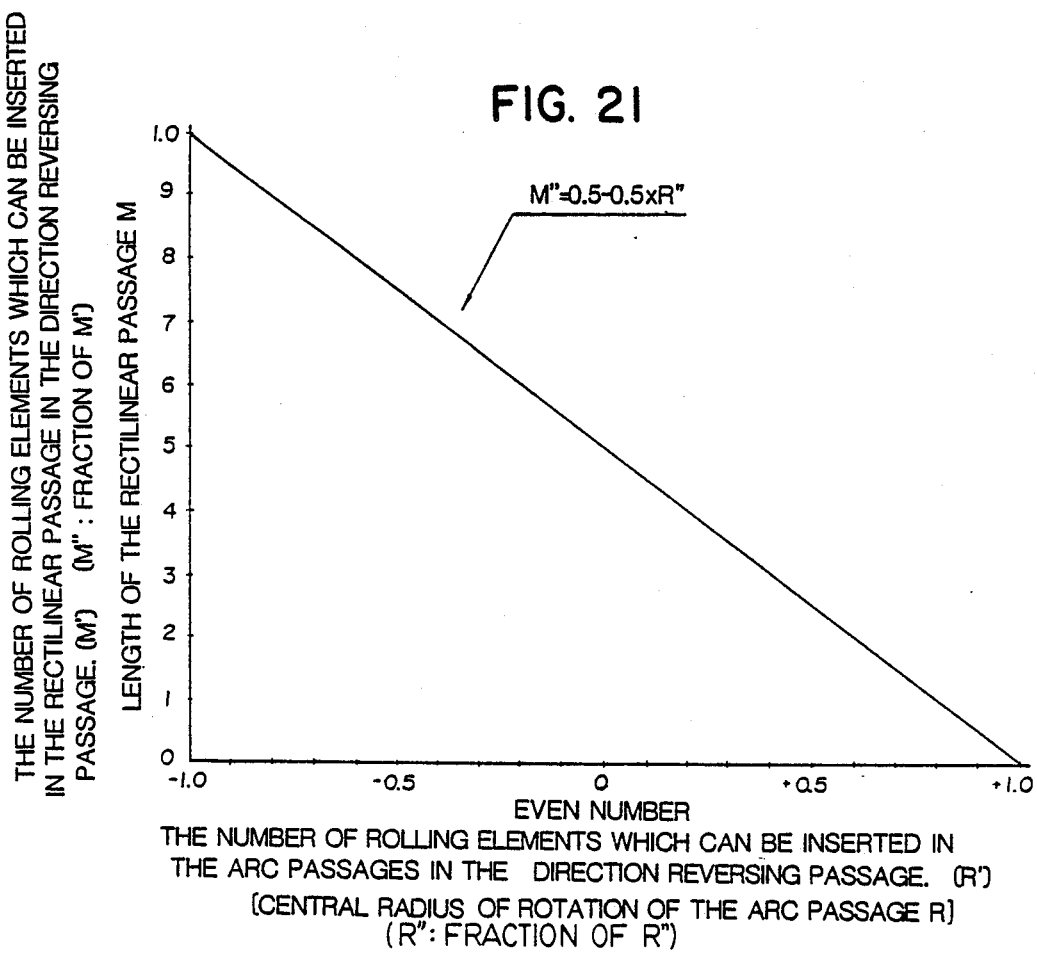

Although the relation between M' and R' is shown in FIG. 20, in the relation between the arc passages (the total passage of both quarter-circular passages) of the direction reversing passage and the intermediate rectilinear passage whereby the in/out change amount becomes minimum in the case where the direction reversing passage has the intermediate rectilinear passage, there is the relation of M''=(0.5−0.5R'') as shown in FIG. 21 between the fractions M'' and R'' thereof.

The following matters will be obviously appreciated from FIGS. 20 and 21.

(a) The waveform changes at a period of D$_a$.

(b) The maximum and minimum values of the waveform decrease with an increase in R'.

(c) The in/out change amount becomes minimum when R'≈(even number+0.2) or R'≈(odd number+0.1).

(d) As shown in FIG. 21, the relational expression between R' and M' in FIG. 20 is as follows.

$$M''=0.5-0.5\times R'' \quad (20)$$

where,

R''=$\beta$ when R'=even number+$\beta$, and
R''=−1+$\beta$ when R'=odd number+$\beta$.

The length M' of the intermediate rectilinear passage which is obtained is M'=(integer+M'')×D$_a$. However, in the case where M' is smaller than 0.5, the in/out change amount becomes minimum when M' is a value which is slightly different from the above-mentioned value.

The above description relates to the result of the consideration with respect to only one of the direction reversing passages each of which has the intermediate rectilinear passage.

The whole infinite circuit including the track passage and return passage has to be analyzed in further consideration of the relation among the three factors of R' and M' and L'. The number of combinations thereof will become extremely larger than that in the above-described case depending upon the relation in magnitude among those three factors.

However, as explained above, since the optimum relation between R' and M' can be found out, if L' is analyzed under the condition regarding the optimum relation between R' and M', it is possible to find out the proper relation among R' and M' and L' whereby the minimum in/out change amount is obtained. As a result of this analysis, the following relation was obtained between L'' and R'' which are the fractions of L' and R'.

$$L'' = 0.25 - 0.5R'' \quad (21)$$

where, assuming that $\alpha$ is a fraction,
$R'' = \alpha$ when $R' = $ even number $+ \alpha$, and
$R'' = -1 + \alpha$ when $R' = $ odd number $+ \alpha$.

Figure 22:
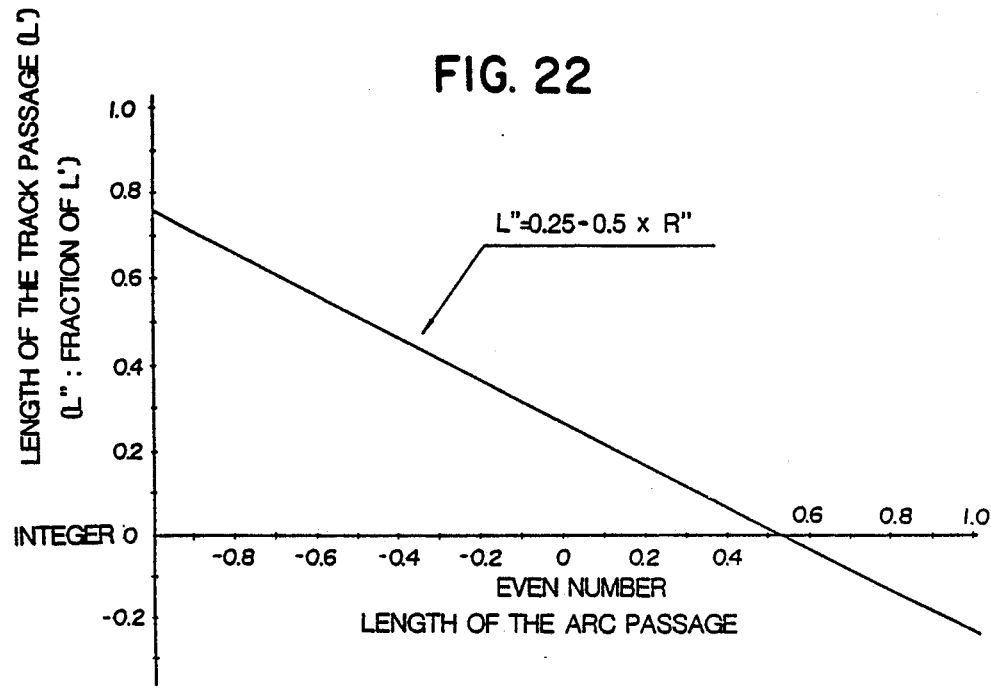

FIG. 22 shows this relation. A value of L' is derived by assuming that $L' = $ (integer $+ L''$).

Figure 23:
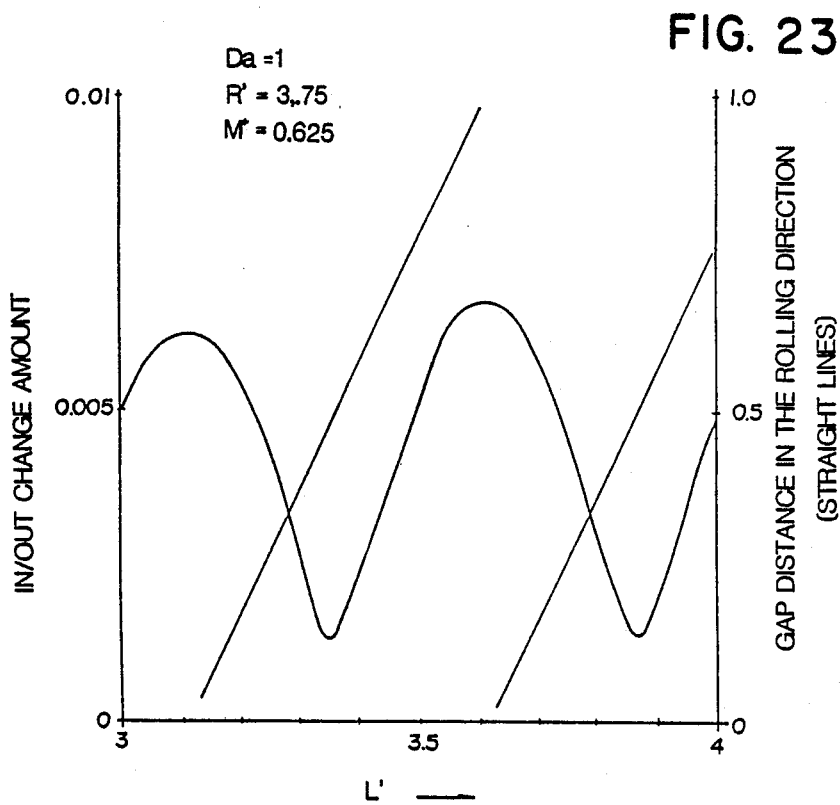

It can be seen from an example shown in FIG. 23 that the minimum value of the in/out change amount repeatedly appear as the substantially same value at a period of $0.5D_a$ with a change in value of L'. Even in the case where $L' = $ (integer $+ L'' + 0.5$), a similar result is also obtained.

When the expression indicative of the relation between R'' and M'' is represented by expression (20), the minimum value of the in/out change amount relating to L' appears at a period of $0.5D_a$, but the period as the waveform is $D_a$.

FIG. 23 shows the example of the relation among R' and M' and L' when $D_a = 1$ and $R' = 3.75$ and $M' = 0.625$.

All of the above data were obtained as the result of the calculation.

Next, the actual measurement values will be explained.

Figure 24:
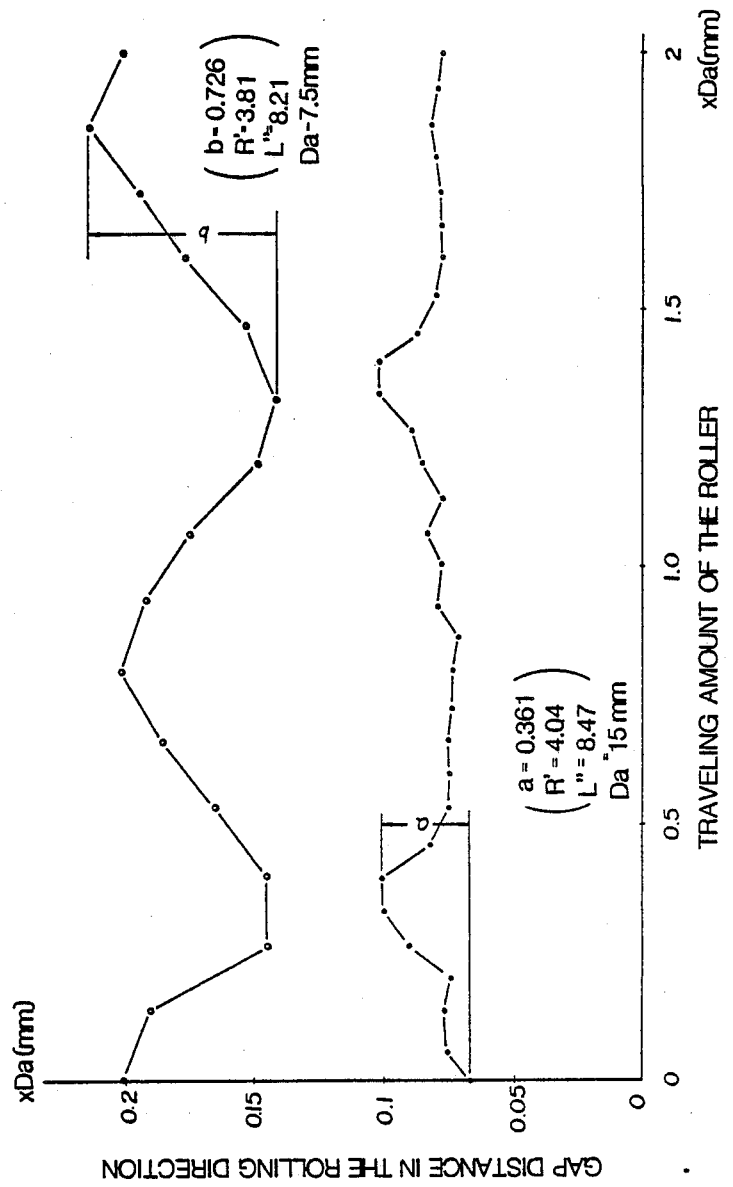
Figure 25:
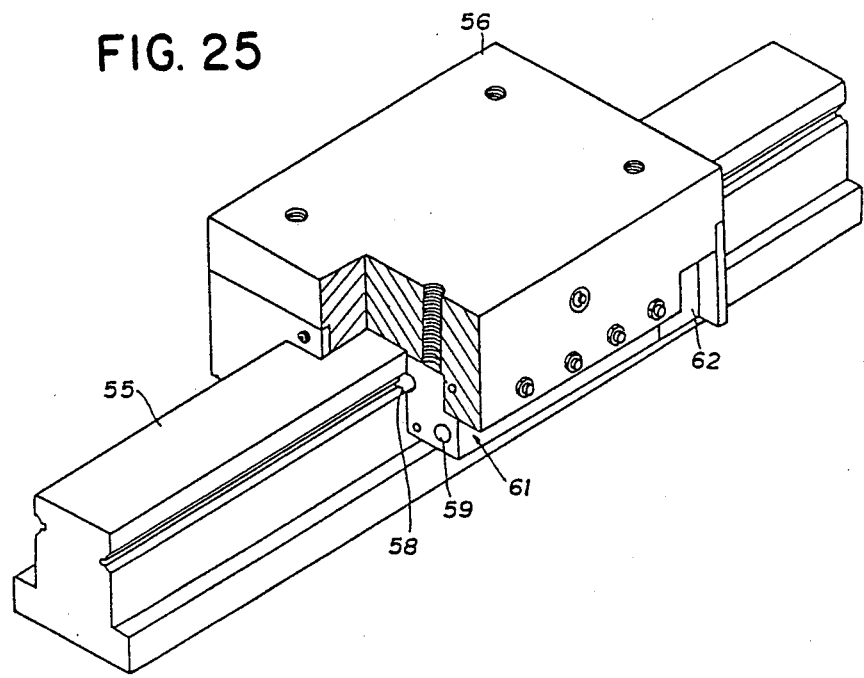
Figure 26:
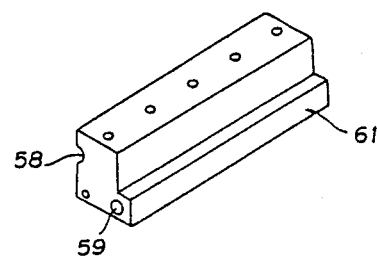
Figure 27:
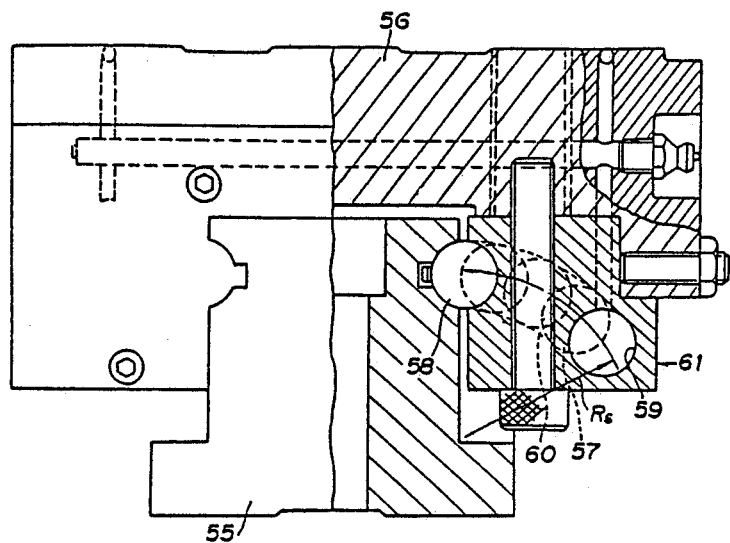
Figure 28:
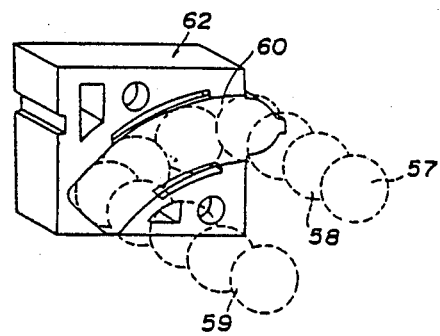
Figure 29:
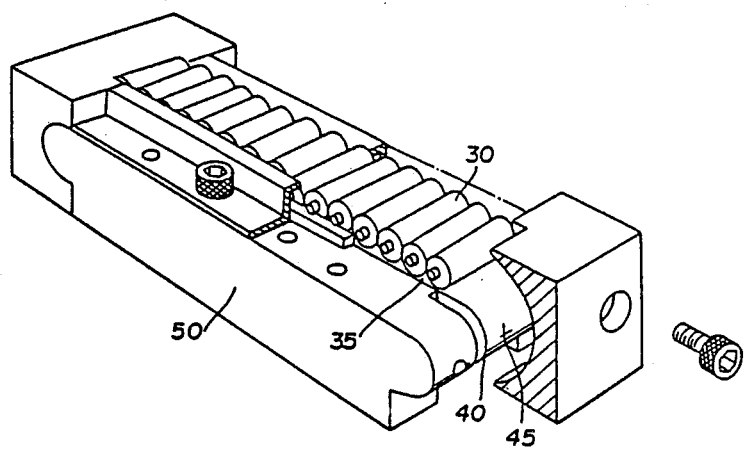
Figure 30A:
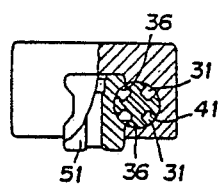
Figure 30B:
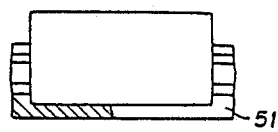
Figure 30C:
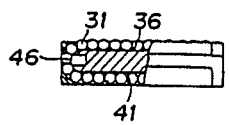
Figure 30D:
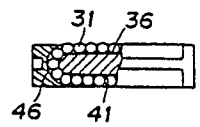
Figure 31A:
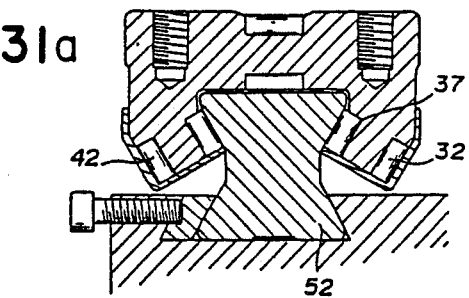
Figure 31B:
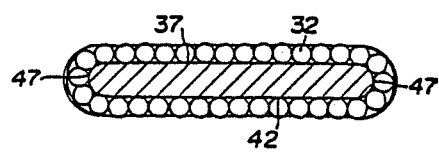
Figure 31C:
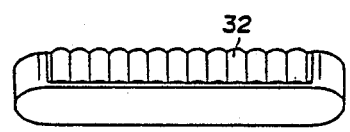
Figure 32A:
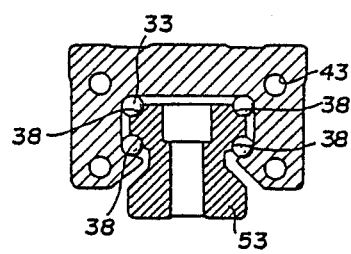
Figure 32B:
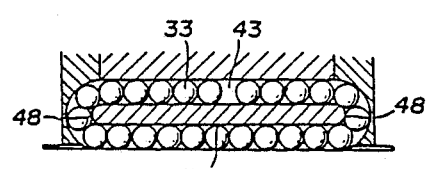
Figure 33A:
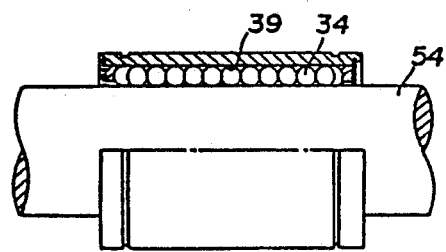
Figure 33B:
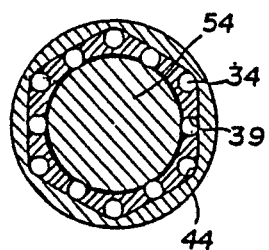
Figure 33C:
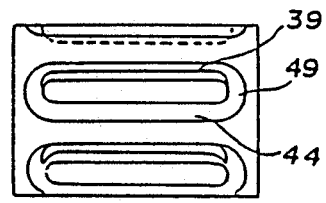

FIG. 24 shows the result of the measurement of the gap distance in the rolling direction with respect to the rolling bearings for providing the rectilinear motion of the type shown in FIG. 29 in the cases where the rollers are filled in the infinite circuit and the gap in the rolling direction is caused at only one portion in the rectilinear passage and where the rollers are rolled and moved in one direction by 1 mm at a time. The in/out change amounts are indicated by a and b in the diagram. Referring now to the upper curve in FIG. 24, $b = 0.726$ under the conditions of $D_a = 7.5$ mm and $R' = 3.81$ and $L = 8.21$. In the lower curve, $a = 0.361$ under the conditions of $D_a = 15$ mm and $R' = 4.04$ and $L' = 8.47$.

It will be appreciated from the above result of the measurement that the in/out change amount when $R' \approx $ (integer $+ 0.25$) is small, namely, good values are derived. In addition, as described before, R' denotes the maximum number of rolling elements which can be filled in the direction reversing passage and L' indicates the maximum number of rolling elements which can be filled in the rectilinear passage.

In the rolling bearings for the rectilinear motion whereby the rollers or balls are used as the rolling elements and the endless rectilinear motion is performed by endlessly circulating the rolling elements in the infinite circuit, particularly in the rolling bearings for the rectilinear motion whereby the mutually neighboring rolling elements are in the direct contact with each other and each cross sectional view of the rolling elements in the infinite circuit on the axial central planes of the track passage and return passage is represented by the circle of the same diameter, the conditions in that the sliding resistance of the bearings due to the occurrence of stick slip of the rolling elements while they are rectilinearly moving can be extremely made small are as follows.

I. In the case where the direction reversing passage is semicircular shaped:
(i) Set R' into a value near (integer $+ 0.25$).
(ii) Set R' into a value near (integer $+ 0.25$) and set L' into an integer of a value of (integer $+ 0.5$).

(iii) In case of setting R' into a value other than the above values, L' is obtained by the following expression. When the fractions of L' and R' are L'' and R'', $$L'' = 0.5 - R''$$

where, assuming that the fraction is $\alpha$, and that $R' = $ integer $+ \alpha$,
$R'' = \alpha$ when $0 \leq \alpha \leq 0.5$, and
$R'' = -1 + \alpha$ when $0.5 < \alpha < 1$.
L' which is obtained becomes a value near (integer $+ L''$). In addition, L' is practically set into a value near (integer $+ L' \pm 0.1$).

II. In the case where the direction reversing passage is formed by the two quarter-circular passages and one intermediate rectilinear passage.

(i) The relation between R' and M' is obtained by the following expression.

$$M'' = 0.5 - 0.5R''$$

where the fractions of R' is R'' and the fraction of M' is M''. Assuming that the fraction is $\beta$,
$R'' = \beta$ when $R' = $ even number $+ \beta$, and
$R'' = -1 + \beta$ when $R' = $ odd number $+ \beta$.
M' which is obtained becomes a value near (integer $+ M''$). In addition, the above-mentioned integer is a positive integer.

(ii) A value of L' under the above-mentioned conditions is obtained by the following expression.

$$L'' = 0.25 - 0.5 \, R''$$

where, the fractions of L' and R' are L'' and R''. In this case,
$R'' = \beta$ when $R' = $ even number $+ \beta$, and
$R'' = -1 + \beta$ when $R' = $ odd number $+ \beta$.
L' which is obtained becomes a value of (integer $+ L''$) or (integer $+ L' + 0.5$).

This invention has the constitutions set forth in the claims 1, 2, 3, and 4, and according to the invention, it is possible to obtain the rolling bearings for providing the rectilinear motion whereby the sliding resistance due to the stick slip while the rolling elements are rectilinearly moving is extremely small by minimizing the occurrence of stick slip of the rolling elements which roll in the infinite circuit consisting of the rolling bearings for the rectilinear motion by suitably setting R' and L' and M' under the conditions of I-(i), (ii) and (iii) and II-(i) and (ii) mentioned above. According to the rolling bearings for the rectilinear motion with the constitution of the present invention, they can be employed even to the equipment in which it was difficult to utilize the conventional rolling bearings for the rectilinear motion, so that remarkably wider applicability than the conventional bearings can be attained.

Although the present invention has been shown and described with respect to particular embodiments, various changes and modifications which are obvious to a person skilled in the art to which the invention pertains are deemed to lie within the spirit and scope of the invention.

What is claimed is:

1. An infinite circuit using rolling bearings for providing the rectilinear motion, comprising:
   (a) rolling elements consisting of rollers or balls;
   (b) rolling bearings, constituted by said rolling elements, for providing the infinite rectilinear motion by endlessly circulating said rolling elements in an infinite circuit while keeping the direct contact relation with each other;

(c) a rectilinear track passage in the region where a weight is applied thereto;

(d) a rectilinear return passage in the region where no weight is applied thereto; and (e) two direction reversing passages, each of which passages consisting of two quarter-circular passages which are connected in series, said direction reversing passages respectively coupling both ends of said track passage and said return passage, thereby enabling the moving direction of said rolling elements to be smoothly reversed, wherein the cross sections of said respective rolling elements at the axial central plane of said infinite circuit having the circular cross sections of the same diameter which are sequential in contact relation with each other, and assuming that a radius of curvature of the arc portion of the locus which is formed by the center of each rolling element which rolls in said direction reversing passage is R and that a diameter of said rolling element is $D_a$ and that $$R' = \frac{90}{\sin^{-1}\left(\frac{D_a}{2R}\right)}$$

(where, R' indicates a value corresponding to the maximum number of said rolling elements which can be inserted in said two quarter-circular passages of the direction reversing passage on the basis of said radius R of curvature of said direction reversing passage), said R' being set into a value near (integer+0.25).

2. An infinite circuit using rolling bearings for providing the rectilinear motion, comprising:

(a) rolling elements consisting of rollers or balls;

(b) rolling bearings, constituted by said rolling elements, for providing the infinite rectilinear motion by endlessly circulating said rolling elements in an infinite circuit while keeping the direct contact relation with each other;

(c) a rectilinear track passage in the region where a weight is applied thereto;

(d) a rectilinear return passage in the region where no weight is applied thereto; and (e) two direction reversing passages, each of which passages consisting of two quarter-circular passages which are connected in series through an intermediate rectilinear passage interposed therebetween, said direction reversing passages respectively coupling both ends of said track passage and said return passage, thereby enabling the moving direction of said rolling elements to be smoothly reversed, wherein the cross sections of said respective rolling elements at the axial central plane of said infinite circuit having the circular cross sections of the same diameter which are sequential in contact relation with each other, and assuming that a radius of curvature of the arc portion of the locus which is formed by the center of each rolling element which rolls in said direction reversing passage is R; that a diameter of said rolling element is $D_a$; that a length of each of said track passage and said return passage is L; that a length of said intermediate rectilinear passage provided between said two quarter-circular passages in said direction reversing passage is M; and that $$R' = \frac{90}{\sin^{-1}\left(\frac{D_a}{2R}\right)}$$

$$L' = L/D_a$$
$$M' = M/D_a$$

(where, R' indicates a value corresponding to the maximum number of said rolling elements which can be inserted in said two quarter-circular passages of the direction reversing passage on the basis of said radius R of curvature of said direction reversing passage), said R' being set into a value near (integer+0.25) and said L' being set into a value near (integer+0.5×integer) in the case where M'=0, namely, where said direction reversing passage is the semicircular passage.

3. An infinite circuit using rolling bearings for providing the rectilinear motion, comprising:

(a) rolling elements consisting of rollers or balls;

(b) rolling bearings, constituted by said rolling elements, for providing the infinite rectilinear motion by endlessly circulating said rolling elements in an infinite circuit while keeping the direct contact relation with each other;

(c) a rectilinear track passage in the region where a weight is applied thereto;

(d) a rectilinear return passage in the region where no weight is applied thereto; and (e) two direction reversing passages, each of which passages consisting of two quarter-circular passages which are connected in series through an intermediate rectilinear passage interposed therebetween, said direction reversing passages respectively coupling both ends of said track passage and said return passage, thereby enabling the moving direction of said rolling elements to be smoothly reversed, wherein the cross sections of said respective rolling elements at the axial central plane of said infinite circuit having the circular cross sections of the same diameter which are sequential in contact relation with each other, and assuming that a radius of curvature of the arc portion of the locus which is formed by the center of each rolling element which rolls in said direction reversing passage is R; that a diameter of said rolling element is $D_a$; that a length of each of said track passage and said return passage is L; that a length of said intermediate rectilinear passage provided between said two quarter-circular passages in said direction reversing passage is M; and that $$R' = \frac{90}{\sin^{-1}\left(\frac{D_a}{2R}\right)}$$

$$L' = L/D_a$$
$$M' = M/D_a$$

(where, R' indicates a value corresponding to the maximum number of said rolling elements which can be inserted in said two quarter-circular passages of the direction reversing passage on the basis of said radius R of curvature of said direction reversing passage), in the case where M'=0, namely, where said direction reversing passage is the semicircular passage, when said R' is set into a value other than the values near (integer+0.25), $$L'' = 0.5 - R'' \quad (0 \leq L'' \leq 0.5, \ 0 \leq R'' \leq 0.5),$$

and when said R' is a value of (integer+α),
$R'' = \alpha$ in a range of $0 \leq \alpha \leq 0.5$, and
$R'' = -1 + \alpha$ in a range of $0.5 < \alpha < 1.0$,
and said L' being set into a value near (integer+L'').

4. An infinite circuit using rolling bearings for providing the rectilinear motion, comprising:
 (a) rolling elements consisting of rollers or balls;
 (b) rolling bearings, constituted by said rolling elements, for providing the infinite rectilinear motion by endlessly circulating said rolling elements in an infinite circuit while keeping the direct contact relation with each other;
 (c) a rectilinear track passage in the region where a weight is applied thereto;
 (d) a rectilinear return passage in the region where no weight is applied thereto; and
 (e) two direction reversing passages, each of which passages consisting of two quarter-circular passages which are connected in series through an intermediate rectilinear passage interposed therebetween, said direction reversing passages respectively coupling both ends of said track passage and said return passage, thereby enabling the moving direction of said rolling elements to be smoothly reversed, wherein the cross sections of said respective rolling elements at the axial central plane of said infinite circuit having the circular cross sections of the same diameter which are sequential in contact relation with each other, and assuming that a radius of curvature of the arc portion of the locus which is formed by the center of each rolling element which rolls in said direction reversing passage is R; that a diameter of said rolling element is $D_a$; that a length of each of said track passage and said return passage is L; that a length of said intermediate rectilinear passage provided between said two quarter-circular passages in said direction reversing passage is M; and that $$R' = \frac{90}{\sin^{-1}\left(\frac{D_a}{2R}\right)}$$

$$L' = L/D_a$$
$$M' = M/D_a$$

(where, R' indicates a value corresponding to the maximum number of said rolling elements which can be inserted in said two quarter-circular passages of the direction reversing passage on the basis of said radius R of curvature of said direction reversing passage), in the case where $M' \neq 0$, namely, where said direction reversing passage consists of said two quarter-circular passages and said one intermediate rectilinear passage, $$M'' = 0.5 - 0.5 R''$$

where,
$R'' = \beta$ when R' is (even number+β), and
$R'' = -1 + \beta$ when R' is (odd number+β),
and said M' being set into a value near (integer+M'')
and said L' being set into a value near (integer+L''),
where $L'' = (0.25 - 0.5 \times R'')$.

* * * * *